US 6,738,093 B1

(12) United States Patent
Kitagawa et al.

(10) Patent No.: US 6,738,093 B1
(45) Date of Patent: May 18, 2004

(54) ANALOG MEMORY DEVICE FOR DIGITAL IMAGING APPARATUS

(75) Inventors: Shuji Kitagawa, Ibaraki (JP);
Fumitaka Okamoto, Ibaraki (JP)

(73) Assignee: NuCORE Technology, Inc., Santa Clara, CA (US)

( * ) Notice: Subject to any disclaimer, the term of this patent is extended or adjusted under 35 U.S.C. 154(b) by 0 days.

(21) Appl. No.: 09/236,028

(22) Filed: Jan. 22, 1999

(30) Foreign Application Priority Data

Jan. 26, 1998 (JP) ............................................. 10-012408

(51) Int. Cl.$^7$ ................................................. H04N 5/76
(52) U.S. Cl. .................................................. 348/231.99
(58) Field of Search ........................ 348/231.99, 222.1, 348/231.1, 231.2, 231.3, 231.4, 231.5, 231.6, 231.7, 231.8, 231.9; 341/155, 172; 365/45, 46, 47, 48

(56) References Cited

U.S. PATENT DOCUMENTS

| 5,170,262 | A | * | 12/1992 | Kinoshita et al. | ........... | 358/906 |
| 5,272,535 | A | * | 12/1993 | Elabd | ........................ | 348/314 |
| 5,396,286 | A | * | 3/1995 | Ishizuki | ..................... | 348/208 |
| 5,414,464 | A | * | 5/1995 | Sasaki | ........................ | 348/231 |
| 5,760,727 | A | * | 6/1998 | Lin | ............................. | 341/155 |
| 5,808,676 | A | * | 9/1998 | Biegelsen | .................. | 348/308 |
| 6,289,127 | B1 | * | 9/2001 | Ikeda | ........................ | 348/231 |
| 6,594,036 | B1 | * | 7/2003 | Wong et al. | ................. | 358/471 |

OTHER PUBLICATIONS

Aslam–Siddiqi, A.; Brockherde, W.; Schanz, M.; Hosticka, B.J.; □ □ Solid–State Circuits, IEEE Journal of, vol.: 33 Issue: 10, Oct. 1998, page(s): 1497–1501.*
Gerna, D.; Brattoli, M.; Chioffi, E.; Colli, G.; Pasotti, M.; Tomasini, A.; □ □ Circuits and Systems, 1996. ISCAS '96., 'Connecting the World'., 1996 IEEE International Symposium on, vol.: 1, May 12–15, 1996, pages(s): 289–292 vol. 1.*

* cited by examiner

Primary Examiner—Wendy R. Garber
Assistant Examiner—Justin Misleh
(74) Attorney, Agent, or Firm—Townsend and Townsend and Crew LLP; Kenneth R. Allen

(57) ABSTRACT

An image photographing apparatus for storing interleaved data having a number of discrete analog values which is output from an image sensing section and digitized by an A/D conversion section includes an analog semiconductor memory device and a control section. The analog semiconductor memory device stores the interleaved data from the image sensing section as analog data. The control section writes the interleaved data output from the image sensing section upon photographing in the analog semiconductor memory device, reads out the written interleaved data from the analog semiconductor memory device, and outputs the data to the A/D conversion section.

10 Claims, 8 Drawing Sheets

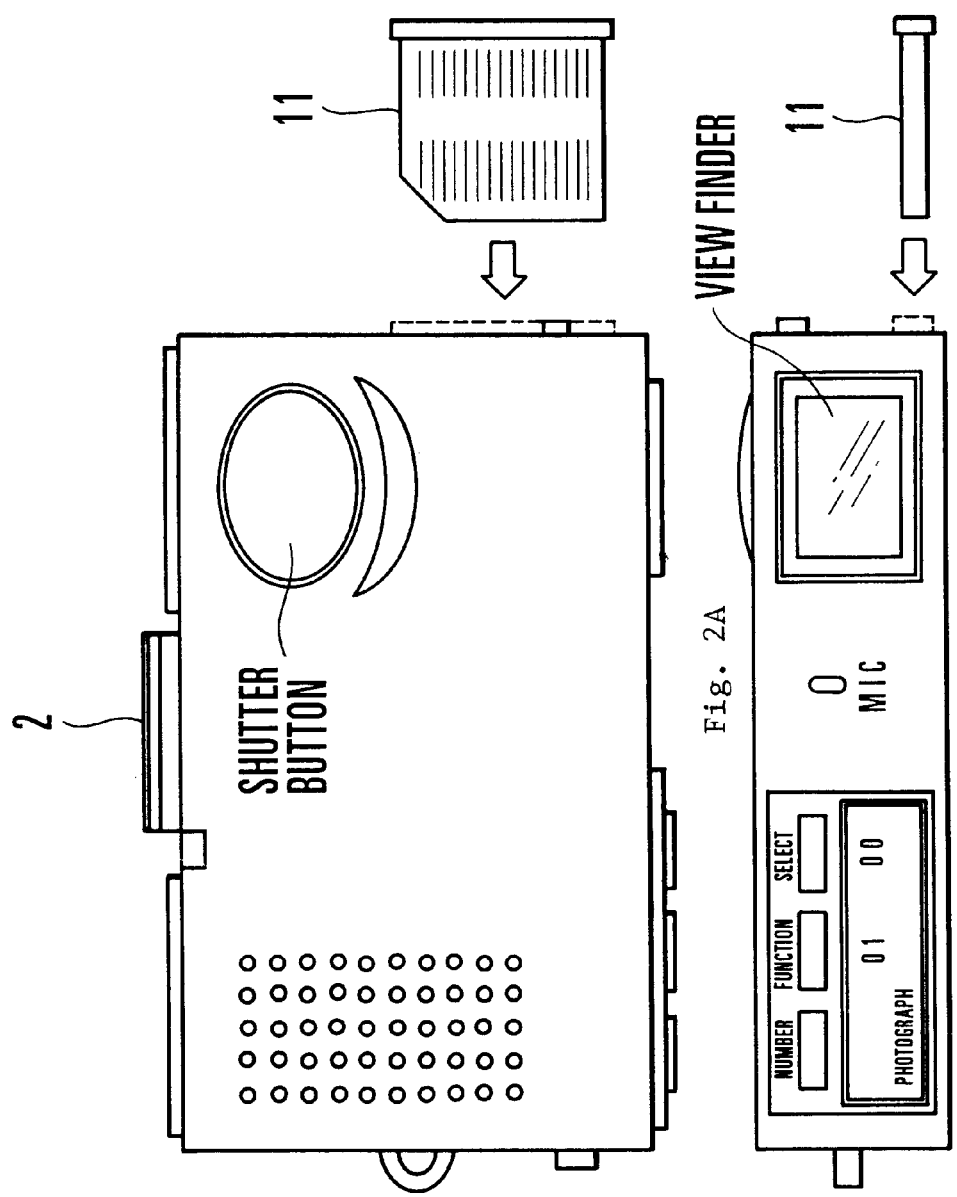

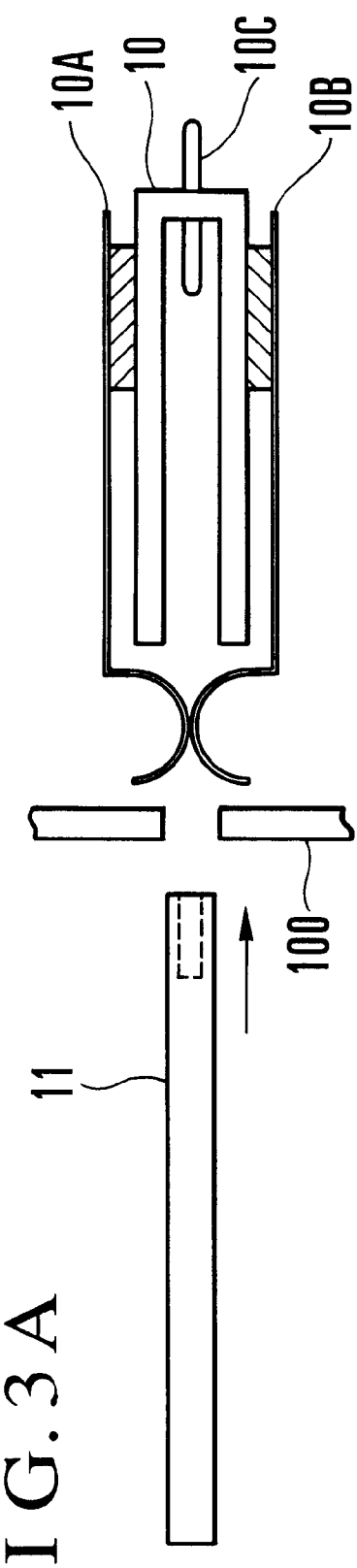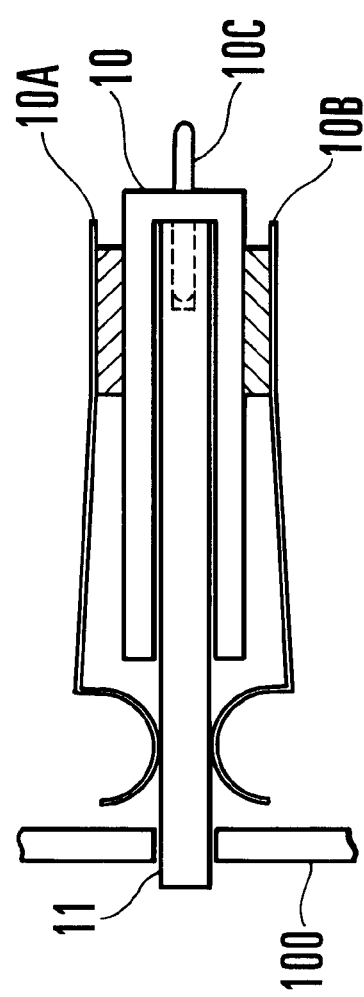
FIG. 3A
FIG. 3B

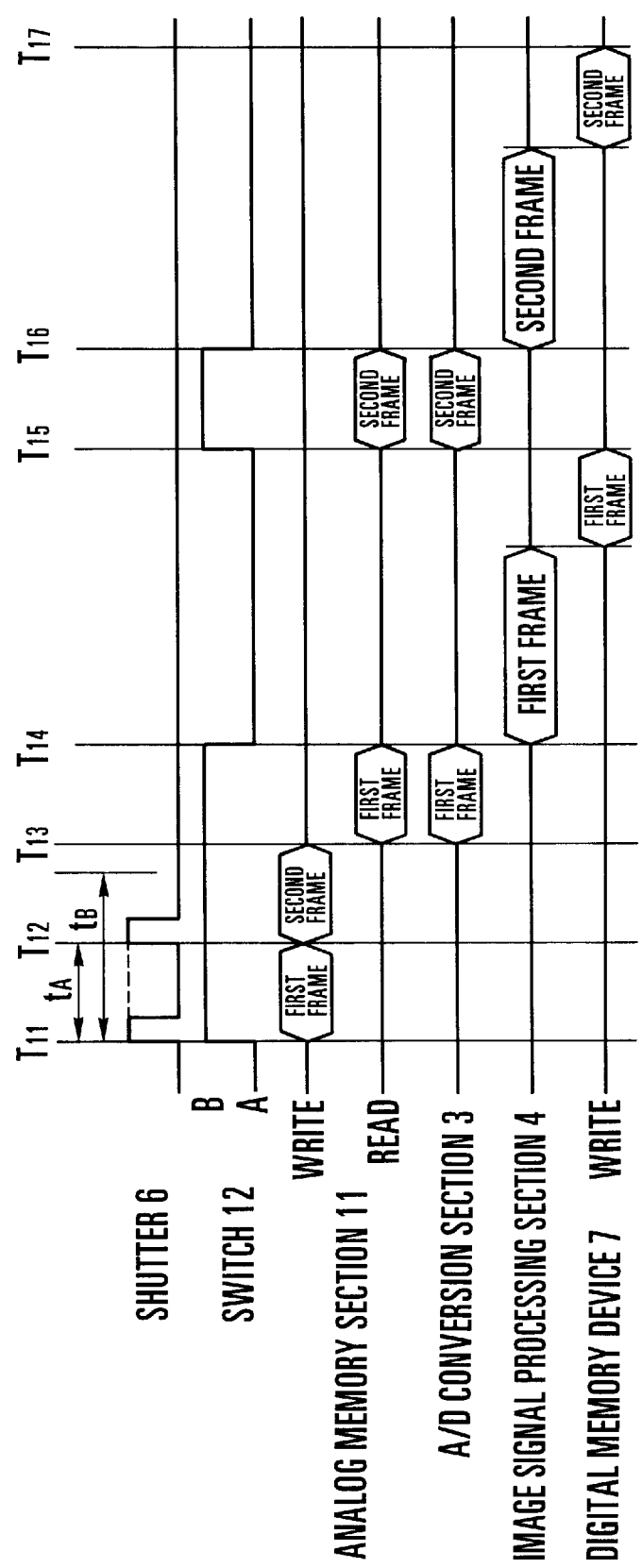

ANALOG MEMORY DEVICE FOR DIGITAL IMAGING APPARATUS

BACKGROUND OF THE INVENTION

The present invention relates to an image photographing apparatus and, more particularly, to an image photographing apparatus for digitizing interleaved data from an image sensing section by an A/D conversion section and storing the data.

In a conventional image photographing apparatus of this type called an electronic camera, interleaved data extracted as an analog value from an image sensing section having an image sensing element such as a CCD is converted into a digital value by an A/D conversion section and stored in a nonvolatile digital memory device such as a nonvolatile digital semiconductor memory device, solid-state memory device, or floppy disk memory device.

FIG. 7 shows a conventional image photographing apparatus. FIG. 8 shows the operations of various portions of the conventional image photographing apparatus.

Upon detecting the ON state of the shutter button (not shown) of an operation section 6 at time $T_1$, a control section 5 outputs an image receiving instruction to an image sensing section 1.

In response to this, the image sensing section 1 photoelectrically converts an image sensed through an optical system 2 and outputs interleaved data (image sensing output data) comprised of a number of discrete analog values representing pieces of color information of pixels in synchronism with a predetermined clock signal.

This interleaved data is converted into a digital value by an A/D conversion section 3 from time $T_2$, developed into image data and compressed by an image signal processing section 4 such as a DSP, and then stored in a nonvolatile digital memory device 7 (digital memory device) from $T_3$.

Compression is processing of reducing the amount of resultant image data. By compression, the amount of data stored in the nonvolatile digital memory device 7 is decreased to make it possible to store more image data.

When a display section 8 such as an LCD is provided, as needed, the image data from the image sensing section 1 or image signal processing section 4 is displayed on a screen of the display section 8.

In the conventional image photographing apparatus, however, interleaved data obtained from the image sensing section is A/D-converted and compressed, and then stored in the nonvolatile digital memory device. For this reason, a new image cannot be received while these operations are being performed. That is, images cannot be continuously received at a short interval.

When an A/D conversion section 3 or image signal processing section 4 having high processing performance is used, the processing time can be shortened to some extent. However, such a high-performance A/D converter or DSP is expensive to result in an increase in cost of the product.

SUMMARY OF THE INVENTION

The present invention has been made to solve the above problem, and has as its object to provide an image photographing apparatus capable of continuously receiving images at a short interval.

In order to achieve the above object of the present invention, there is provided an image photographing apparatus for storing interleaved data having a number of discrete analog values which is output from an image sensing section and digitized by an A/D conversion section, comprising an analog semiconductor memory device for storing the interleaved data from the image sensing section as analog data, and a control section for writing the interleaved data output from the image sensing section upon photographing in the analog semiconductor memory device, reading out the written interleaved data from the analog semiconductor memory device, and outputting the data to the A/D conversion section.

BRIEF DESCRIPTION OF THE DRAWINGS

FIG. 2A is a top view showing the outer appearance of the image photographing apparatus according to an embodiment of the present invention.

FIG. 2B is a side view of the object of FIG. 2A.

FIG. 2C is a back view of the object of FIG. 2A.

FIGS. 3A and 3B are explanatory views showing the arrangement of an analog semiconductor memory device attaching/detaching detection mechanism;

FIG. 4 is a timing chart showing the operation of the first embodiment of the present invention;

DESCRIPTION OF THE PREFERRED EMBODIMENTS

The present invention will be described below with reference to the accompanying drawings.

Figure 1:
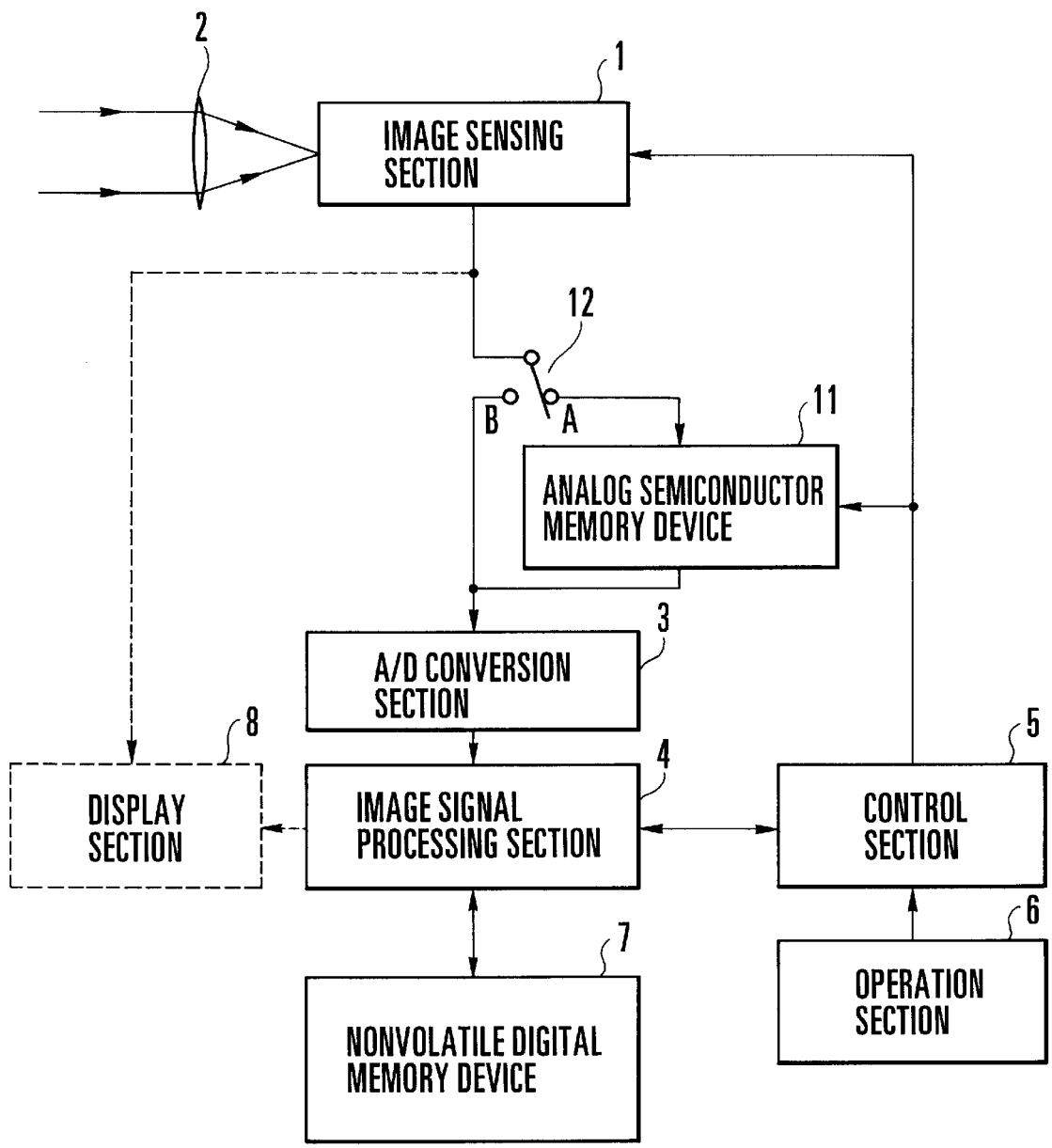
FIG. 1 is a block diagram showing an image photographing apparatus according to an embodiment of the present invention.
Figure 7:
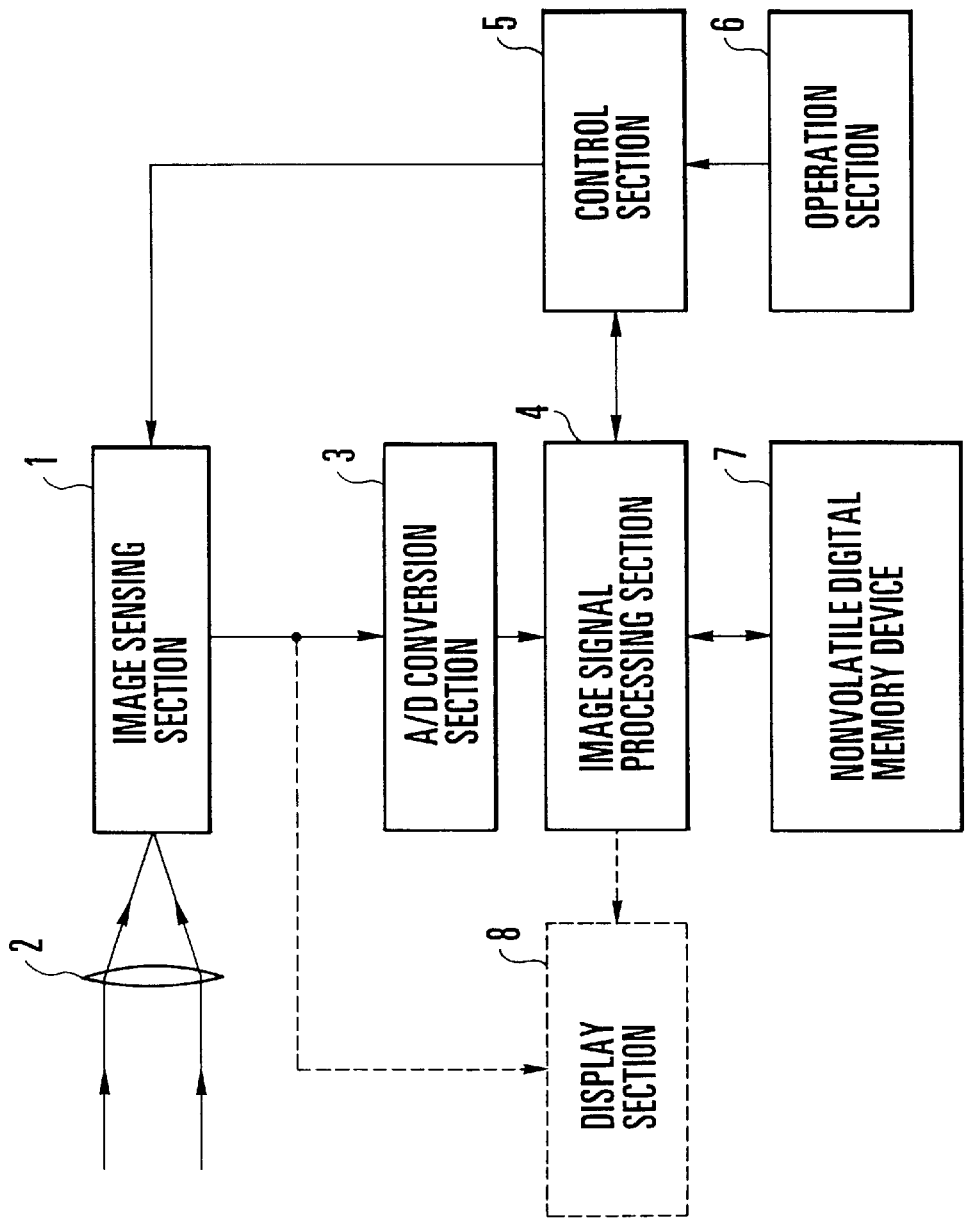
FIG. 7 is a block diagram showing a conventional image photographing apparatus.

FIG. 1 shows an image photographing apparatus according to an embodiment of the present invention. The same reference numerals as the above description (FIG. 7) denote the same or similar parts in FIG. 1.

In the present invention, an analog semiconductor memory device 11 is inserted between an image sensing section 1 and an A/D conversion section 3 to store interleaved data from the image sensing section as analog data.

As the analog semiconductor memory device 11, a nonvolatile analog semiconductor memory device having a number of memory cells for individually storing analog potentials to store discrete analog data which are discrete on the time axis and represent a continuous amount on the signal intensity axis is used. With this arrangement, interleaved data from the image sensing section 1 is temporarily stored in the analog semiconductor memory device 11 functioning as a cache memory. Interleaved data reception by the image sensing section 1 is separated on the time axis from digital compression storage processing from the A/D conversion section 3, i.e., interleaved data digitization by the A/D conversion section 3, compression by an image signal processing section 4, and storage in a nonvolatile digital memory device 7.

Since an analog semiconductor memory device for storing interleaved data as analog data is used as a cache memory for holding interleaved data output from the image sensing section 1, the time required to store the interleaved data becomes much shorter than the time of digital compression storage processing. Consequently, new interleaved data can be continuously received in a short interval before digital compression storage processing is complete.

Storage in the nonvolatile digital memory device 7 is performed by reading out interleaved data temporarily written in the analog semiconductor memory device 11. For this reason, digital compression storage processing of interleaved data need not be performed at a high speed. Because of the low-speed operation, the power consumption can be reduced.

In addition, an inexpensive A/D conversion section 3 or image signal processing section 4 having relatively low processing capability can be used to considerably reduce the cost of the entire image photographing apparatus.

Referring to FIG. 1, a switch 12 is connected to the output side of the image sensing section 1. The analog semiconductor memory device 11 is connected to a terminal A of the switch 12, and the A/D conversion section 3 is connected to a terminal B of the switch 12.

When the switch 12 is connected to the terminal A side, as needed, interleaved data from the image sensing section 1 is written in the analog semiconductor memory device 11 as analog data or read out from the analog semiconductor memory device 11 as analog data.

When the switch 12 is connected to the terminal B side, interleaved data from the image sensing section 1 is directly input to the A/D conversion section 3.

The switch 12 may be connected to the input side of the A/D conversion section 3 to select, as interleaved data to be input to the A/D conversion section 3, interleaved data read out from the analog semiconductor memory device 11 or interleaved data output from the image sensing section 1. Alternatively, synchronously operating switches may be connected on both the output side of the image sensing section 1 and the input side of the A/D conversion section 3.

FIG. 2 shows the outer appearance of the image photographing apparatus of the present invention.

In this case, the analog semiconductor memory device 11 has, e.g., an IC card shape which can be easily attached/detached through a connector.

With this arrangement, the analog semiconductor memory device 11 can be separated from the image photographing apparatus as a constituent element for obtaining an additional function, i.e., a user option, so the basic cost of the image photographing apparatus can be reduced.

Even when the analog semiconductor memory device 11 has a write count limit, i.e., service life, the analog semiconductor memory device 11 can be easily exchanged. Hence, even an inexperienced user can easily do the maintenance operation.

Since the analog semiconductor memory device 11 can be attached/detached while keeping interleaved data recorded, the analog semiconductor memory device 11 can also be used as a film, i.e., an image recording medium.

FIGS. 3A and 3B explain an analog semiconductor memory device attaching/detaching detection mechanism.

Referring to FIGS. 3A and 3B, reference numeral 10 denotes a slot for receiving the analog semiconductor memory device 11; and 10A and 10B, leaf spring contacts for detecting attaching/detaching the analog semiconductor memory device 11 to/from the slot 10.

Reference numeral 10C denotes a connector terminal for connecting the analog semiconductor memory device 11 to the circuit portion of the image photographing apparatus main body; 100, a case cover of the image photographing apparatus.

As shown in FIG. 3A, when the analog semiconductor memory device 11 is not inserted into the slot 10, the leaf spring contacts 10A and 10B are pressed against each other and electrically connected, i.e., set in the ON state.

As shown in FIG. 3B, when the analog semiconductor memory device 11 is inserted into the slot 10, the analog semiconductor memory device 11 itself is inserted between the leaf spring contacts 10A and 10B.

The leaf spring contacts 10A and 10B are electrically disconnected from each other and set in the OFF state.

The leaf spring contacts 10A and 10B are turned on/off in response to attaching/detaching the analog semiconductor memory device 11.

The ON/OFF state is detected by a control section 5, and the switch 12 is connected in response to attaching/detaching the analog semiconductor memory device 11. With this arrangement, the photographing operation can be controlled.

The attaching/detaching detection mechanism for the analog semiconductor memory device 11 is not limited to this. For example, an unused connector terminal 10C may be used to detect the insertion.

For example, when the analog semiconductor memory device 11 is inserted, a predetermined potential is supplied from the analog semiconductor memory device 11 side to a detection connector terminal. Attaching/detaching the analog semiconductor memory device 11 can be detected in accordance with the potential of the detection connector terminal.

The control section 5 determines whether digital compression storage processing of previously received interleaved data written in the analog semiconductor memory device 11 is complete. Only when the processing is ended, the interleaved data written in the analog semiconductor memory device 11 is read out and output to the A/D conversion section 3.

Hence, the interleaved data written in the analog semiconductor memory device 11 is automatically read out for digital compression storage processing. Also, the digital compression storage processing is properly performed in units of frames.

Digital compression storage processing of interleaved data written in the analog semiconductor memory device 11 may be started in response to a predetermined operation.

For example, only a write in the analog semiconductor memory device 11 is performed in response to a predetermined photographing instruction, and then digital compression storage processing is performed in response to a predetermined operation.

With this arrangement, even when the nonvolatile digital memory device 7 malfunctions or has failures, images equal in amount to the storage capacity of the analog semiconductor memory device 11 can be photographed.

In addition, the nonvolatile digital memory device 7 can be exchanged or maintained anytime. Even when the nonvolatile digital memory device 7 is detached, photographing can be performed, so the operation reliability of the image photographing apparatus can be improved.

In digital compression storage processing, large power is consumed because an enormous amount of interleaved data is subjected to many processes at a high speed.

If the battery level of the image photographing apparatus lowers to deteriorate the power supply condition, automatic execution of digital compression storage processing during photographing is stopped in response to a predetermined operation. By performing only the write in the analog semiconductor memory device 11, the power consumption can be reduced to increase the photographing enable time or photographing enable count.

When the power supply condition improves, e.g., power is supplied by exchanging the battery or using a DC adapter, interleaved data recorded in the analog semiconductor memory device 11 is read out in response to a predetermined operation, and digital compression storage processing is restarted.

After photographing, the interleaved data is developed and compressed to image data and stored in the nonvolatile digital memory device. That is, the same state as that under a stable power supply condition can be restored.

Digital compression storage processing may be automatically stopped during photographing not in response to a predetermined operation but in accordance with the power supply condition of the image photographing apparatus.

More specifically, the power supply condition is monitored. When the condition deteriorates, automatic execution of digital compression storage processing is stopped, and when the condition improves, automatic execution is restarted.

With this arrangement, the user can continue photographing without being conscious of the deterioration of power supply condition.

Alternatively, when the power supply condition improves, digital compression storage processing of interleaved data recorded in the analog semiconductor memory device 11 may be automatically restarted.

With this arrangement, even when automatic cancel of digital compression storage processing is automatically controlled, the storage capacity of the analog semiconductor memory device 11 can be effectively used.

As an operation according to the first embodiment of the present invention, an operation of continuously photographing images at a short interval while normally using an analog semiconductor memory device will be described below with reference to FIG. 4.

FIG. 4 shows the operation of the first embodiment of the present invention.

When a predetermined photographing instruction, e.g., the ON state of the shutter button (not shown) of an operation section 6 is detected by the control section 5 at time $T_{11}$, a control section 5 outputs an image reception instruction to the image sensing section 1.

In response to the instruction, an image sensing section 1 controls image sensing elements to photoelectrically convert an image obtained through an optical system 2 by the image sensing element.

Interleaved data comprised of a number of discrete analog values representing pieces of color information of pixels is output in synchronism with a predetermined clock signal.

In the first embodiment, a switch 12 is connected to a terminal A side in response to the photographing instruction under the control of the control section 5.

The interleaved data of the first frame output from the image sensing section 1 in response to the photographing operation is written in an analog semiconductor memory device (analog memory device) 11.

Since the interleaved data is written as analog data, A/D conversion and compression are unnecessary. At time $T_{12}$ a little after time $T_{11}$, the write of interleaved data in the analog semiconductor memory device 11 is ended.

At time $T_{12}$, when a continuous photographing instruction is output, e.g., the shutter button has been continuously depressed for a period $t_A$ from time $T_{11}$ digital compression storage processing of the interleaved data of the first frame is not started. Instead, newly obtained interleaved data of the second frame is continuously written in the analog semiconductor memory device 11.

Up to the full storage capacity of the analog semiconductor memory device 11, interleaved data from the second frame can be continuously written at a short interval (interval from time $T_{11}$ to $T_{12}$).

If no continues photographing instruction is output, after the write of the interleaved data of the second frame is ended, a nonvolatile digital memory device (digital memory device) 7 starts storing each interleaved data from time $T_{13}$.

At time $T_{13}$, the switch 12 is connected to the terminal A side, and the interleaved data of the first frame is read out from the analog semiconductor memory device 11 and input to the A/D conversion section 3.

The interleaved data is sequentially digitized and subjected to predetermined compression processing by an image signal processing section 4 from time $T_{14}$ and stored in the nonvolatile digital memory device 7.

In a similar manner, the interleaved data of the second frame is read out from the analog semiconductor memory device 11 at time $T_{15}$ and digitized. The data is compressed from time $T_{16}$ and stored in the nonvolatile digital memory device 7, and the processing is ended at time $T_{17}$.

In the present invention, "digitized interleaved data is compressed by the image signal processing section 4" actually means "digitized interleaved data is developed to image data and then compressed".

Normally, when the image sensing section 1 comprises a color filter CCD or the like, each pixel has individual color information of red, blue, or green of the color filter. Hence, analog interleaved data output from the image sensing section 1 is constituted by pixel information having individual color information of one of red, blue, and green.

On the other hand, the display output system for storing the image data requires information having all pieces of color information of red, blue, and green in units of pixels. For this reason, the interleaved data from the image sensing section 1 must be developed to image data for the display output system.

Hence, the image signal processing section 4 develops the interleaved data digitized by the A/D conversion section 3 to image data for the display output system, then compresses the image data on the basis of a predetermined compression algorithm, and outputs it to the nonvolatile digital memory device 7.

Figure 8:
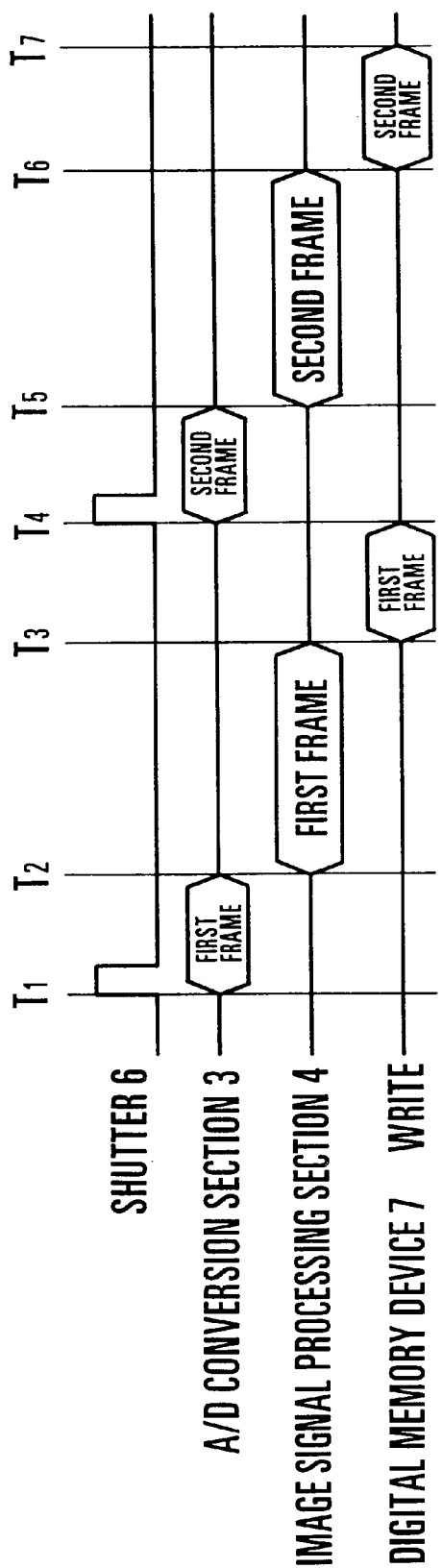
FIG. 8 is a timing chart showing the operation of the conventional image photographing apparatus.

When the analog semiconductor memory device 11 is normally used as a cache memory, images can be continuously photographed at a much shorter interval than that in the prior art (FIG. 8) in which interleaved data is converted into digital data and then written in the memory, i.e., images can be photographed at a time interval (time $T_{11}$ to $T_{12}$) required to write interleaved data in the analog semiconductor memory device 11 without being influenced by the time required for digital compression storage processing, i.e., A/D conversion, compression, and storage in the nonvolatile digital memory device.

In the present invention, a photographing instruction includes not only an instruction for making the user to depress the shutter button but also external instructions and autonomous photographing instructions such as a timer function by the control section 5.

In the present invention, the continues photographing operation is equivalent to the continuous photographing operation of a camera generally using a silver salt film as a recording medium.

Specific examples of the continuous photographing operation are cases in which the shutter button has been continuously depressed for the predetermined period $t_A$ or more in FIG. 4, the shutter button is newly depressed at a short interval, e.g., in a predetermined period $t_B$, and a plurality of number of times of photographing are autonomously performed by the control section 5 as a short interval.

As an operation according to the second embodiment of the present invention, an operation of continuously photographing images at a short interval by using an analog semiconductor memory device as needed will be described next with reference to FIG. 5.

Figure 5:
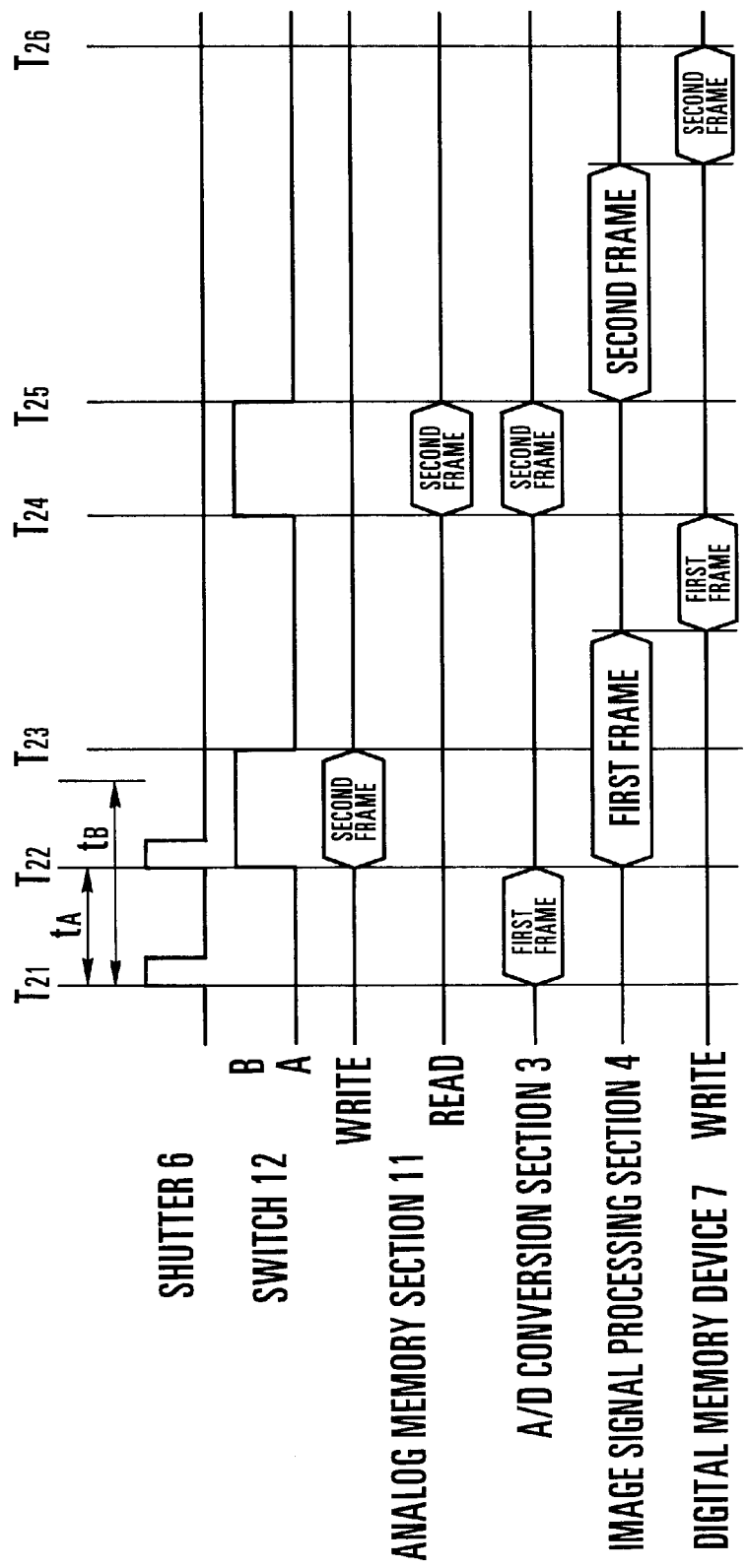
FIG. 5 is a timing chart showing the operation of the second embodiment of the present invention.

FIG. 5 shows the operation of the second embodiment of the present invention.

In this case, digital compression storage processing of received interleaved data is preferentially performed. Only during this processing, interleaved data is written in an analog semiconductor memory device 11.

At time $T_{21}$, when a photographing instruction is detected by a control section 5, the control section 5 outputs an image reception instruction to an image sensing section 1.

In this case, since digital compression storage processing is not performed, the control section 5 connects a switch 12 to a terminal B side.

The obtained interleaved data is directly input to an A/D conversion section 3 and digitized. After this, at time $T_{22}$, the data is input to an image signal processing section 4 to start compression, and then, stored in a nonvolatile digital memory device 7.

When digitization by the A/D conversion section 3 is ended, i.e., at time $T_{22}$, reception of the next interleaved data is enabled.

When a photographing instruction is detected again at time $T_{22}$, the control section 5 connects the switch 12 to a terminal A side because the write in the nonvolatile digital memory device 7 is being performed.

The interleaved data obtained at this time is written in the analog semiconductor memory device 11 as analog data.

At time $T_{24}$ when storage of the interleaved data of the first frame is complete, the write of the interleaved data of the second frame in the analog semiconductor memory device 11 is already ended.

Hence, the interleaved data of the second frame is immediately read out and digitized.

At time $T_{25}$, compression is started, and the data is stored in the nonvolatile digital memory device 7. At time $T_{26}$, processing is ended.

As described above, digital compression storage processing of interleaved data obtained by photographing is preferentially performed, and only during this processing, the analog semiconductor memory device 11 is used as a cache memory. Because the number of times of the read/write from/in the analog semiconductor memory device 11 decreases, the power consumption is reduced accordingly.

In continuous photographing, compression of the interleaved data of the first frame and the write of the interleaved data of the second frame in the analog semiconductor memory device 11 can be parallelly executed.

Therefore, continues photographing can be performed at a much shorter interval than that of the prior art (FIG. 8), i.e., at only a time interval (time $T_{21}$ to $T_{22}$) required for A/D conversion without being influenced by the time required for compression or recording in the nonvolatile digital memory device 7.

As compared to the above-described first embodiment (FIG. 4), the time required to write interleaved data from the image sensing section 1 in the analog semiconductor memory device 11, i.e., time $T_{11}$ to $T_{13}$ is unnecessary.

As a result, the time required to store interleaved data of two images in the nonvolatile digital memory device 7 can be made shorter (time $T_{21}$ to $T_{26}$) than the time $T_{11}$ to $T_{17}$ (FIG. 4) in the above-described first embodiment.

As an operation according to the third embodiment of the present invention, an operation of continuously photographing images at an arbitrary timing while using an analog semiconductor memory device as needed will be described next with reference to FIG. 6.

Figure 6:
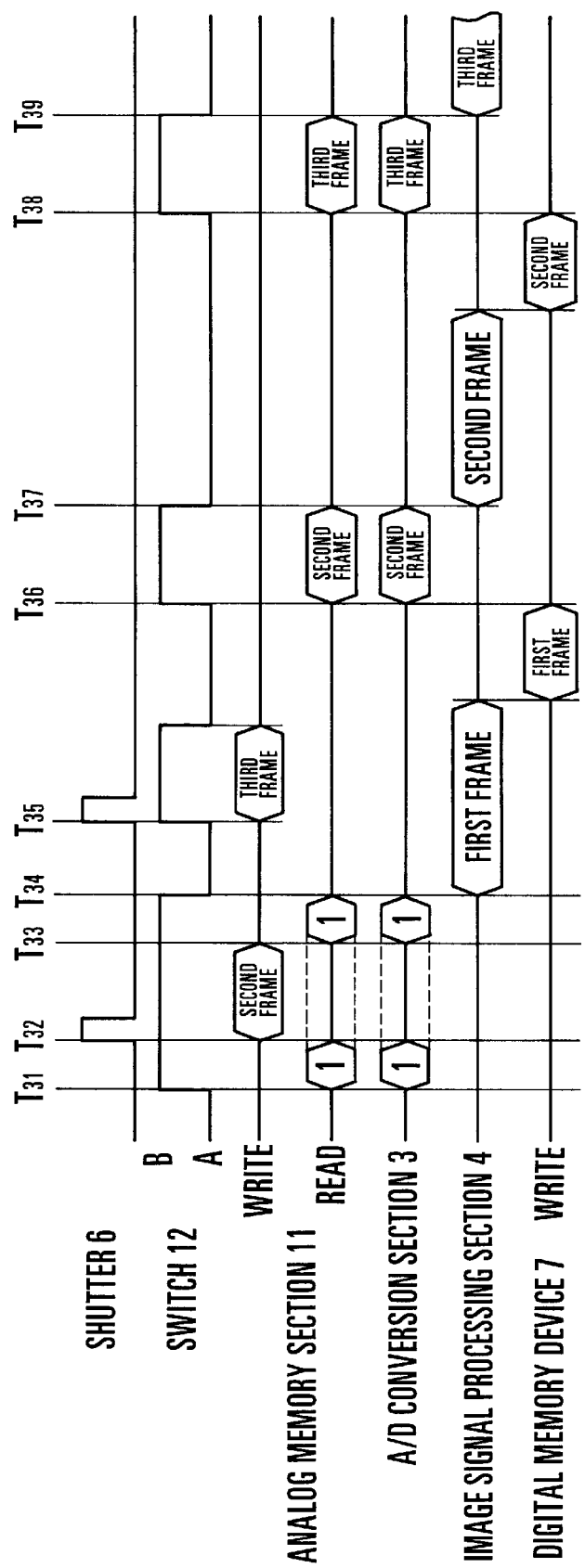
FIG. 6 is a timing chart showing the operation of the third embodiment of the present invention.

FIG. 6 shows the operation of the third embodiment of the present invention.

Unlike the first and second embodiments, when a photographing instruction is detected while interleaved data is being read out from an analog semiconductor memory device 11, the read of interleaved data is stopped to write newly photographed interleaved data.

Referring to FIG. 6, at time $T_{31}$, the read of the already written interleaved data of the first frame from the analog semiconductor memory device 11 is started.

When a photographing instruction is detected at time $T_{32}$ during the read, a control section 5 temporarily stops the read from the analog semiconductor memory device 11 and writes new interleaved data of the second frame from an image sensing section 1 in the analog semiconductor memory device 11.

In response to the end of the write of the second frame at time $T_{33}$, the stopped read of the first frame is restarted.

After this, compression and storage of the interleaved data of the first frame are executed from time $T_{34}$, as described above. From time $T_{36}$, digital compression storage processing of the interleaved data of the second frame is executed, and the data is stored in a nonvolatile digital memory device 7.

When the write in the analog semiconductor memory device 11 is preferentially performed, a new image can be photographed even during the read of interleaved data from the analog semiconductor memory device 11, so an image photographing apparatus which will not miss shutter chances can be realized.

When a photographing instruction is detected while compression or storage of interleaved data digitized by an A/D conversion section 3 is being executed, newly photographed interleaved data is written in the analog semiconductor memory device 11, as indicated by "third frame" in FIG. 6, parallel to the processing.

With this arrangement, even when compression or storage of interleaved data digitized by the A/D conversion section 3 is being executed, a new image can be photographed, so an image photographing apparatus which will not miss shutter chances can be realized.

As has been described above, in the present invention, an analog semiconductor memory device for storing interleaved data from the image sensing section as analog data is arranged. Interleaved data output from the image sensing section upon photographing is written in the analog semiconductor memory device, and the written interleaved data is read out from the analog semiconductor memory device and output to the A/D conversion section.

The interleaved data from the image sensing section is temporarily stored in the analog semiconductor memory device functioning as a cache memory. Hence, interleaved data reception by the image sensing section can be separated on the time axis from processing operations from digitization to storage by the sections from the A/D conversion section.

Since the analog semiconductor memory device for storing interleaved data as analog data is used as a cache memory for holding interleaved data from the image sensing section, the time required to store the interleaved data is largely shortened as compared to the prior art in which interleaved data is digitized and then stored.

Consequently, new interleaved data can be continuously received at a short interval without waiting for the end of interleaved data storage.

Storage in the nonvolatile digital memory device is performed after the interleaved data temporarily written in the analog semiconductor memory device is read out. For this reason, processing from digitization to storage of interleaved data need not be performed at a high speed. Because of the low-speed operation, the power consumption can be reduced.

In addition, an inexpensive A/D conversion section or image signal processing section having relatively low processing capability can be used to considerably reduce the cost of the entire image photographing apparatus.

The apparatus also has an output selection means for outputting interleaved data from the image sensing section to the analog semiconductor memory device or the A/D conversion section.

The image photographing apparatus of claim 1 has an input selection means for inputting interleaved data from the analog semiconductor memory device or the image sensing section to the A/D conversion section.

Use of the analog semiconductor memory device can be selected as needed, and an interleaved data processing method according to the photographing condition can be selected.

The analog semiconductor memory device can be freely attached/detached to/from the image photographing apparatus. With this arrangement, the analog semiconductor memory device can be separated from the image photographing apparatus as a constituent element for obtaining an additional function, i.e., a user option, so the basic cost of the image photographing apparatus can be reduced.

Even when the analog semiconductor memory device has a write count limit, i.e., service life, the analog semiconductor memory device can be easily exchanged. Hence, even an inexperienced user can easily do the maintenance operation.

Since the analog semiconductor memory device can be attached/detached while keeping interleaved data recorded, the analog semiconductor memory device can also be used as a film, i.e., an image recording medium.

After storage of interleaved data digitized by the A/D conversion section is ended, the control section reads out interleaved data written in the analog semiconductor memory device and outputs it to the A/D conversion section. Hence, the interleaved data written in the analog semiconductor memory device is automatically read out and stored. Also, the storage processing is properly performed in units of frames.

The control section reads out interleaved data written in the analog semiconductor memory device and outputs it to the A/D conversion section in response to a predetermined operation. With this arrangement, even when the nonvolatile digital memory device for storing interleaved data malfunctions or has failures, images equal in amount to the storage capacity of the analog semiconductor memory device can be photographed.

In addition, the nonvolatile digital memory device can be exchanged or maintained anytime. Even when the nonvolatile digital memory device is detached, photographing can be performed, so the operation reliability of the image photographing apparatus can be improved.

When the power supply condition of the self apparatus is bad, the control section does not read out interleaved data written in the analog semiconductor memory device. When the power supply condition of the self apparatus is good, the control section reads out interleaved data written in the analog semiconductor memory device and outputs it to the A/D conversion section. If the battery decreases to deteriorate the power supply condition, only the write in the analog semiconductor memory device is performed, so the power consumption for processing from digitization can be reduced.

In addition, the photographing enable time or photographing enable count can be increased without making the user conscious of the deterioration of power supply condition.

The control section writes interleaved data of a plurality of images continuously output from the image sensing section upon photographing in the analog semiconductor memory device. Since the analog semiconductor memory device is normally used as a cache memory, images can be continuously at a much shorter time interval required to write interleaved data in the analog semiconductor memory device without being influenced by the time required for processing from digitization to storage.

The control section directly outputs the interleaved data of the first image output from the image sensing section upon photographing to the A/D conversion section, and writes the interleaved data of an image continuously output from the image sensing section in the analog semiconductor memory device. Hence, images can be continuously photographed at a much shorter interval required to perform A/D conversion without being influenced by the time required for processing from digitization to storage.

When a new image is photographed while interleaved data is being read out from the analog semiconductor memory device, the control section stops reading out interleaved data from the analog semiconductor memory device, writes the new interleaved data output from the image sensing section upon photographing in the analog semiconductor memory device, and then restarts the stopped read of interleaved data. When the write in the analog semiconductor memory device is preferentially performed, a new image can be photographed even during the read of interleaved data from the analog semiconductor memory device, so an image photographing apparatus which will not miss shutter chances can be realized.

When a new image is photographed before storage of interleaved data digitized by the A/D conversion section is complete, the control section writes new interleaved data output from the image sensing section upon photographing in the analog semiconductor memory device. With this arrangement, even before interleaved data digitized by the A/D conversion section is stored, a new image can be photographed, so an image photographing apparatus which will not miss shutter chances can be realized.

What is claimed is:

1. An image photographing apparatus for storing interleaved data having a number of discrete analog values which is output from an image sensing section and digitized by an A/D conversion section comprising:
    a nonvolatile analog semiconductor memory device disposed ahead of said A/D conversion section and having a large plurality of memory cells for individually storing the interleaved data from said image sensing section as analog potentials to store analog data which is discrete in time sampling scale and continuous in signal intensity scale;
    a control section for writing the interleaved data output from said image sensing section upon photographing in said analog semiconductor memory device, reading out the written interleaved data from said analog semiconductor memory device, and outputting the data to said A/D conversion section; and
    output selection means for outputting the interleaved data from said image sensing section to one of said analog semiconductor memory device and said A/D conversion section.

2. An image photographing apparatus for storing interleaved data having a number of discrete analog values which is output from an image sensing section and digitized by an A/D conversion section, comprising:
    a nonvolatile analog semiconductor memory device disposed ahead of said A/D conversion section and having a large plurality of memory cells for individually storing the interleave data from said image sensing section as analog potentials to store analog data which is discrete in time sampling scale and continuous in signal intensity scale;
    a control section for writing the interleaved data output from said image sensing section upon photographing in said analog semiconductor memory device, reading out the written interleaved data from said analog semiconductor memory device, and outputting the data to said A/D conversion section; and
    input selection means for inputting the interleaved data from one of said analog semiconductor memory device and said image sensing section to A/D conversion section.

3. An image photographing apparatus for storing interleaved data having a number of discrete analog values which is output from an image sensing section and digitized by an A/D conversion section, comprising:
    a nonvolatile analog semiconductor memory device disposed ahead of said A/D conversion section and having a large plurality of memory cells for individually storing the interleaved data from said image sensing section as analog potentials to store analog data which is discrete in time sampling scale and continuous in signal intensity scale; and
    a control section for writing the interleaved data output from said image sensing section upon photographing in said analog semiconductor memory device, reading out the written interleaved data from said analog semiconductor memory device, and outputting the data to said A/D conversion section, wherein
        after storage of previously received interleaved data digitized by said A/D conversion section is complete, said control section reads out subsequently received interleaved data written in said analog semiconductor memory device and outputs the subsequently receive interleaved data to said A/D conversion section.

4. An image photographing apparatus for storing interleaved data having a number of discrete analog values which is output from an image sensing section and digitized by an A/D conversion section, comprising:
    a nonvolatile analog semiconductor memory device disposed ahead of said A/D conversion section and having a large plurality of memory cells for individually storing the interleaved data from said image sensing section as analog potentials to store analog data which is discrete in time sampling scale and continuous in signal intensity scale; and
    a control section for writing the interleaved data output from said image sensing section upon photographing in said analog semiconductor memory device, reading out the written interleaved data from said analog semiconductor memory device, and outputting the data to said A/D conversion section, wherein
        said control section reads out the interleaved data written in said analog semiconductor memory deice and outputs the interleaved data to said A/D conversion section in response to a predetermined operation.

5. An image photographing apparatus for storing interleaved data having a number of discrete analog values which is output from an image sensing section and digitized by an A/D conversion section, comprising:
    an analog semiconductor memory device for storing the interleaved data from said image sensing section as analog data; and
    a control section for writing the interleaved data output from said image sensing section upon photographing in said analog semiconductor memory device, reading out the written interleaved data from said analog semiconductor memory device, and outputting the data to said A/D conversion section, wherein
        when a power supply condition of said apparatus is in a first condition, said control section does not read out the interleaved data written in sad analog semiconductor memory device, and when the power supply condition is in a second condition, said control section reads out the interleaved data written in said analog semiconductor memory device and outputs the interleaved data to said A/D conversion section.

6. An apparatus According to claim 5, wherein the first condition comprises a low battery level of aid power supply.

7. An apparatus According to claim 5, wherein the second condition comprises a high battery level of said power supply.

8. An image photographing apparatus for storing interleaved data having a number of discrete analog values which is output from an image sensing section and digitized by an A/D conversion section comprising:
    an analog semiconductor memory device for storing the interleaved data from said image sensing section as analog data; and
    a control section for writing the interleaved data output from said image sensing section upon photographing in said analog semiconductor memory device, reading out the written interleaved data from said analog semiconductor memory device, and outputting the data to said A/D conversion section, wherein said control section directly outputs interleaved data of a first image output from said image sensing section upon photographing to said A/D conversion section and writes interleaved data of the next image continuously output from said age sensing section in said analog semiconductor memory device.

9. An image photographing apparatus for storing interleaved data having a number of discrete analog values which is output from an image sensing section and digitized by an A/D conversion section, comprising:

an analog semiconductor memory device for storing the interleaved data from said image sensing section as analog data; and a control section for writing the interleaved data output from said image sensing section upon photographing in said analog semiconductor memory device, reading out the written interleaved data from said analog semiconductor memory device, and outputting the data to said A/D conversion section, wherein when a new image is photographed while the interleaved data is being read out from said analog semiconductor memory device, said control section stops reading out the interleaved data from said analog semiconductor memory device, writes new interleaved data output from said image sensing section upon photographing in said analog semiconductor memory device, and then restart the stopped read of the interleaved data.

10. An image photographing apparatus for storing interleaved data having a number of discrete analog values which is output from an image sensing section and digitized by an A/D conversion sections comprising:

an analog semiconductor memory device for storing the interleaved data from said image sensing section as analog data; and a control section for writing the interleaved data output from said image sensing section upon photographing in said analog semiconductor memory device, reading out the written interleaved data from said analog semiconductor memory device, and outputting the data to said A/D conversion section, wherein when a new image is photographed before storage of the interleaved data digitized by said A/D conversion section is complete, said control section writes new interleaved data output from said image sensing section upon photographing in said analog semiconductor memory device.

\* \* \* \* \*